United States Patent
Sams (10) Patent No.: US 8,356,855 B2
(45) Date of Patent: Jan. 22, 2013

(54) WEATHER ENCLOSURES FOR GOLF CARTS

(76) Inventor: Matthew Sams, Fort Lauderdale, FL (US)

( * ) Notice: Subject to any disclaimer, the term of this patent is extended or adjusted under 35 U.S.C. 154(b) by 26 days.

(21) Appl. No.: 13/043,198

(22) Filed: Mar. 8, 2011

(65) Prior Publication Data

US 2011/0233957 A1 Sep. 29, 2011

Related U.S. Application Data

(60) Provisional application No. 61/316,656, filed on Mar. 23, 2010.

(51) Int. Cl.
*B60J 5/08* (2006.01)

(52) U.S. Cl. ........ 296/143; 296/141; 296/147; 296/155; 280/DIG. 5

(58) Field of Classification Search .................. 296/77.1, 296/79, 140, 141, 143, 146.1, 147, 149, 155; 280/DIG. 5; 49/316, 374, 376, 425, 427, 49/440; 160/25, 31
See application file for complete search history.

(56) References Cited

U.S. PATENT DOCUMENTS

| | | | | |
|---|---|---|---|---|
| 284,454 A | * | 9/1883 | Mallory | 160/70 |
| 4,717,196 A | * | 1/1988 | Adams | 296/98 |
| 5,855,235 A | * | 1/1999 | Colson et al. | 160/121.1 |
| 6,276,745 B1 | | 8/2001 | Wilson et al. | |
| 7,147,030 B2 | * | 12/2006 | Dalle Nogare et al. | 160/315 |
| 2005/0285426 A1 | | 12/2005 | Brewer et al. | |

FOREIGN PATENT DOCUMENTS

| | | | |
|---|---|---|---|
| DE | 10324084 A1 | * | 12/2003 |
| JP | 09 030263 | | 2/1997 |
| JP | 2001 121968 | | 5/2001 |
| JP | 2002172189 A | * | 6/2002 |

OTHER PUBLICATIONS

International Preliminary Report on Patentability for PCT/US2011/029597 dated Sep. 25, 2012.
Paafuekuto Shoji KK, "Golf Cart," Patent Abstracts of Japan, Publication Date: Feb. 4, 1997; English Abstract of JP-09-030263.
Yanmar Diesel Engine Co Ltd., "Traveling vehicle," Patent Abstracts of Japan, Publication Date: May 8, 2001; English Abstract of JP-2001 121968.

* cited by examiner

*Primary Examiner* — Glenn Dayoan
*Assistant Examiner* — Jason S Daniels
(74) *Attorney, Agent, or Firm* — Millen, White, Zelano & Branigan, P.C.

(57) ABSTRACT

Golf cart weather enclosures have roll-up doors, which coil on spools for storage. The roll-up doors are configured of panels joined by hinges or are configured from sheets of transparent plastic. Each roll-up door has side edges which are received in a pair of spaced vertical tracks extending from the floor to the roof of the golf cart to stabilize the roll-up doors. The spools are rotated either by electric motors and/or springs in a first direction to close the roll-up doors and rotated in the opposite direction to open and store the roll-up doors in the roof.

7 Claims, 10 Drawing Sheets

WEATHER ENCLOSURES FOR GOLF CARTS

RELATED APPLICATIONS

This application claims priority to U.S. Provisional Application 61/316,656, filed Mar. 23, 2010.

FIELD OF THE INVENTION

The present invention is directed to weather enclosures carts, and more particularly to weather enclosures for golf carts, which are mountable on existing or new carts to protect occupants from cold, wind, rain, snow and excessive sunlight.

BACKGROUND OF THE INVENTION

There are many configurations for golf cart enclosures used to protect occupants from the weather and from excessive sunlight. Generally, these enclosures are attachable to roofs and roof supports of existing golf carts and are not readily deployable, but require operation of zippers, snaps fasteners, ties and straps, to deploy or to store the enclosure. This of course is a time consuming and frequently frustrating undertaking, which does not provide occupants with an immediately exercisable option to enclose or open golf carts. When the weather suddenly changes, a golf cart may be on a golf course or may simply being used for neighborhood transportation. If the occupants have flexible covers stored on their golf cart in the usual manor, immediate protection is not available. Frequently, the owners of golf carts leave their weather protection at home and are then caught in sudden weather changes. If the weather is chilly, cold and/or windy, current flexible enclosures are drafty so there is a tendency not to use golf carts in colder weather. This decreases the utility of owning a golf cart and all the attendant advantages of ownership are reduced for activities such as neighborhood transportation.

In view of the aforementioned considerations, there is a need for golf cart weatherproofing which is more convenient, tight and readily available than currently available weather proofing.

SUMMARY OF THE INVENTION

In view of the previously mentioned considerations, a cart weather enclosure arrangement is provided for carts with a roof supported above the carts by vertical struts of frames defining openings for windows and doors. According to the present invention, the arrangement comprises pairs of vertical side struts defining openings for side doors, the side struts each having opposed tracks with facing vertical channels forming channels associated with each pair of vertical side struts. Side roll-up doors are disposed between each pair of vertical side struts, the roll-up doors each being mounted on a pair of spools that are disposed adjacent the roof with each side roll-up door being attached at a top edge to one of the spools. As the spools rotate in a first direction the side roll-up doors roll-up on the spools, and as the spools rotate in an opposite direction, the side roll-up doors slide down the tracks and close the opening. The spools are enclosed in housings for access from within the enclosure and are electrically or manually rotatable.

In a further aspect of the invention the golf cart weather enclosures, the spools are connected to reversible electric motors which open and close the roll-up doors upon receiving current of opposite polarities.

In a further aspect of the invention when the motors are not receiving current the doors are closable and openable manually.

In a further aspect of the invention, the roll-up doors are made of panels hinged to one another with the spools being polygonal in cross section to provide flat surfaces which cause hinged panels forming the roll-up doors to lie substantially flat adjacent one another when the roll-up doors are coiled on the spool.

In a further aspect of the invention, the spools are circular in cross section and the roll-up doors are flexible vinyl panels which coil around the spools for storage.

In a further aspect of the invention, the spools are rotated by reversible electric motors operated by a control switch within or outside the enclosure.

In a further aspect of the invention there is a rear roll-up window or door covering the rear of the enclosure, the rear roll-up window or door being manually or electrically operated.

In still a further aspect of the invention, each side roll-up door has Plexiglas® or plastic panels connected to one another by hinges allowing the panels to fold with respect to one another, the hinges having portions received in vertical channels wherein the panels are pivotal with respect to the channels. The pair of spools disposed adjacent the roof has the side roll-up doors attached at top edges thereto, wherein as the spools rotate in a first direction the side roll-up doors roll-up on the spools, and as the spools rotate in an opposite direction the side roll-up doors slide down the tracks and close the openings The spools are polygonal in cross section to provide substantially flat surfaces causing the panels to lie substantially flush on one another when coiled on the spools, the spools being connected to reversible electric motors which open and close the doors upon receiving current of opposite polarity. When the motors are not receiving current, the doors are closable and openable manually.

In another aspect of the invention, the spools have a triangular cross section.

In another aspect of the invention, a current cut-off switch is activated upon either the side roll-up door encountering resistance above a selected level when being closed, or opened wherein the doors may then be manually operated.

In another aspect of the invention, there is a rear roll-up window or door mounted on a spool disposed adjacent to a rear portion of the roof, the rear roll-up door being operable either separately or simultaneously with the side doors.

In another aspect of the invention, the vertical struts defining windows also have Plexiglas® filler panels supported thereon.

In another aspect of the invention the golf cart has two seats or four seats.

In another aspect of the invention the spools for the roll-up doors are enclosed in housings with an openable door.

BRIEF DESCRIPTION OF THE DRAWINGS

Various other features and attendant advantages of the present invention will be more fully appreciated as the same becomes better understood when considered in conjunction with the accompanying drawings, in which the reference characters designate the same or similar parts throughout the several views, and wherein:

FIG. 11 is a perspective view of a third embodiment of a golf cart configured in accordance with the principles of the present invention;

FIG. 11a is a partial view of a roll-up door of FIGS. 11,12 and 13 showing edges of the roll-up door being disposed in tracks defined by grooves in vertical posts;

FIG. 11b is a view taken along line 11b-11b of FIG. 11a;

FIG. 12 is a side perspective view of the golf cart of FIG. 11 taken from the passenger side of the golf cart;

FIG. 13 is a rear view of the golf cart of FIG. 11 showing a closed rear door;

FIG. 14 is an elevational front view of the golf cart of FIG. 11 taken along the lines 14-14 of FIG. 12;

FIG. 15 is a perspective view of a spool arrangement showing a tubular shaft with a pair of spaced support cams for one of the side roll-up windows, the spool arrangement for the other side roll-up window and rear roll-up being the same or substantially similar;

DETAILED DESCRIPTION

Figure 1:
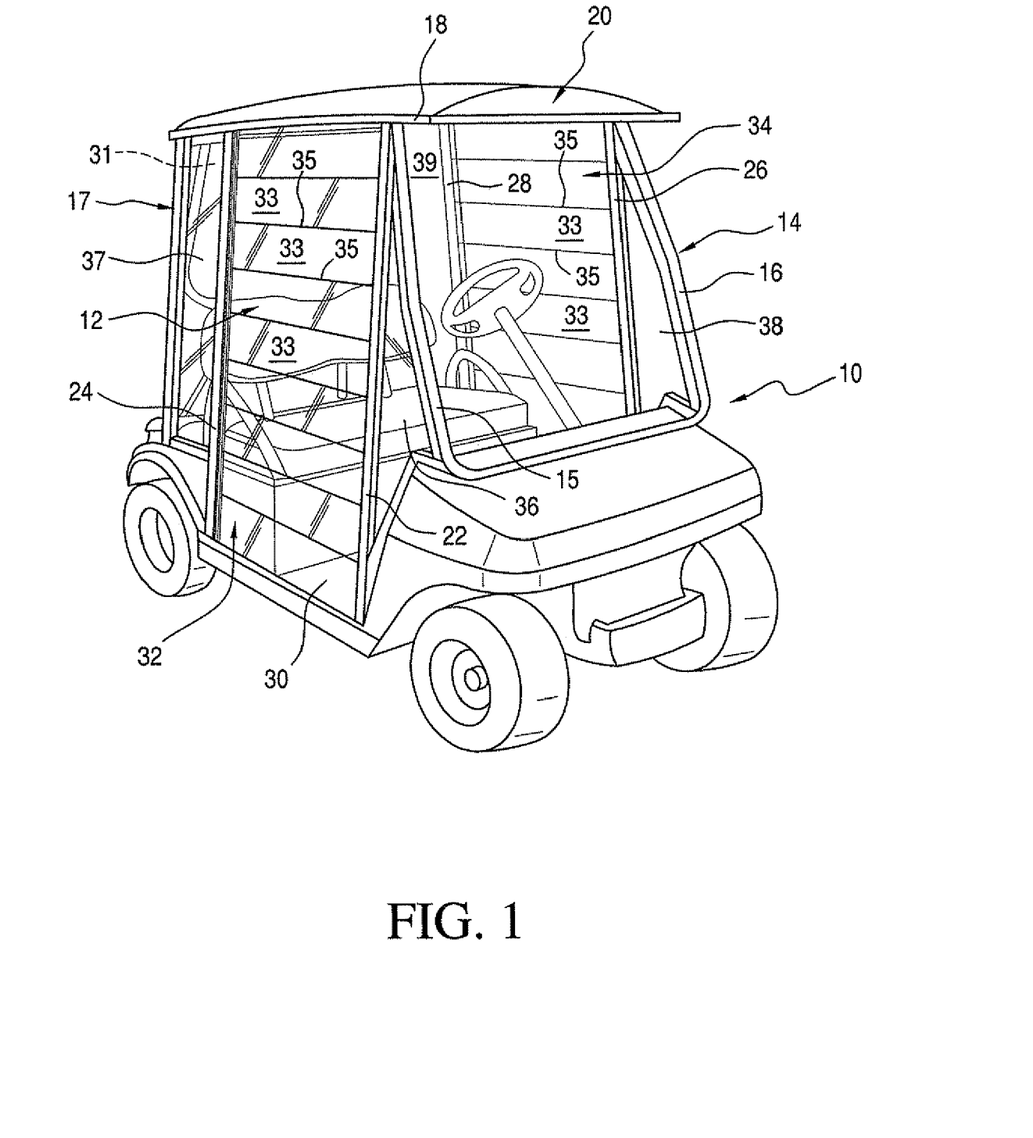
FIG. 1 is a perspective view of a golf cart with a weather enclosure arrangement configured in accordance with the present invention mounted on the golf cart.

Referring now to FIG. 1 there is shown a two seat golf cart 10 with a golf cart weather enclosure 12 mounted thereon. The golf cart 10 is a generic golf cart of a type currently available from a number of manufacturers. The golf cart weather enclosure 12 is disposed within a frame 14 comprised of vertical struts 15, 16, 17 and 18 which support a roof 20 that shields occupants of the golf cart 10 from the sun and provides some overhead protection from rain. The present invention includes additional vertical struts 22 and 24 on the right hand side of the golf cart 10 and vertical struts 26 and 28 on the left hand side of the golf cart (from the perspective of the driver). In a preferred embodiment, the roll-up doors 32 and 34 are segmented doors made of transparent, preferably Plexiglas® or polycarbonate panels 33 joined to one another by hinges 35 of flexible silicon material, which hinges allow the panels to fold with respect to one another, giving the doors sufficient flexibility for storage adjacent the roof 20 of the golf cart 10. The struts 22-28 extend from the floor 30 to the roof 20 of the golf cart 10 to provide guides for roll-up doors 32 and 34 that shield occupants of the golf cart 10 from weather encroachment from the side of the golf cart. Fixed Plexiglas® filler panels 36, 37, 38 and 39, supported both by the frame 14 and the struts 22, 24, 26 and 28, provide additional weather shielding.

The rear of the weather enclosure 12 for golf cart 10 optionally includes another roll-up door or window 31 which provides occupants of the golf cart with further weather protection. The golf cart 10 is illustrated for two people; however, the golf cart may include two additional passengers who sit behind front passengers and in many situations face rearwardly rather than frontwardly.

Figure 2:
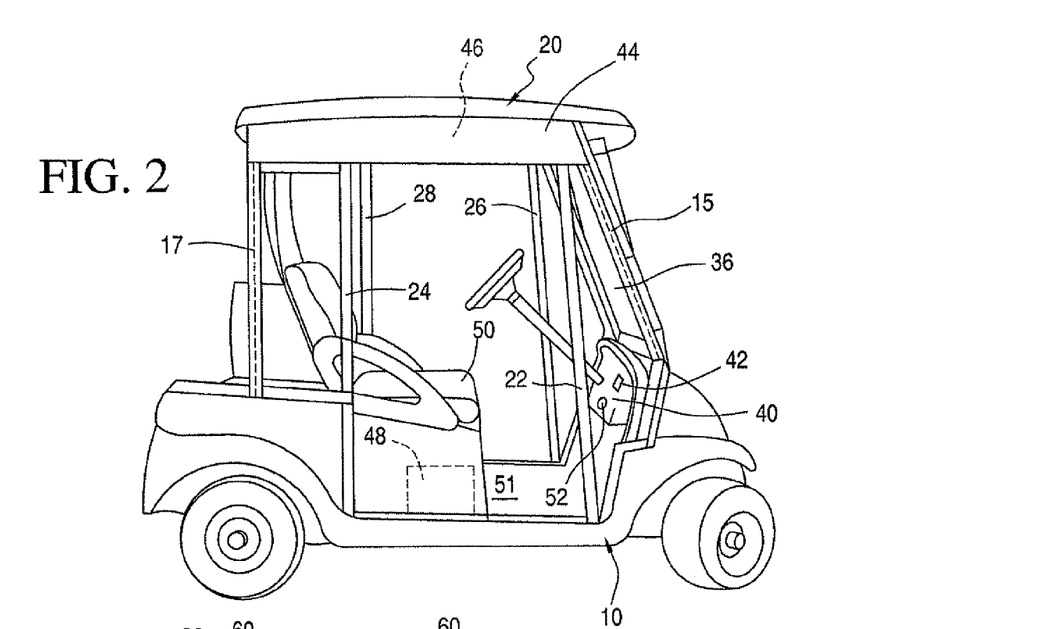
FIG. 2 is a side view of the golf cart of FIG. 1.

Referring now to the side view of FIG. 2, where the roll-up doors 32, 34 and 31 are stored adjacent the roof 20, it is seen that the golf cart 10 has a dashboard 40 with a control switch 42 thereon that is preferably a three-way switch connected via wires (not shown) which are within a strut, such as the front strut 15 to lead up to housings 44 and 46 from which the roll-up doors 32 and 34 of FIG. 1 downwardly extend when deployed as in FIG. 1. A second strut, such as the strut 17, provides a channel though which wires from batteries 48 located on the floor 51 under the seat 50 of the golf cart 10 power motors (FIGS. 3 and 4) which lower and raise the roll-up doors 32 and 34. A second three-way switch 52 is connected by wires led through a channel in strut 16 to separately raise and lower the rear roll-up door or window 31 which is optionally provided to entirely enclose occupants within the vehicle.

Figure 3:
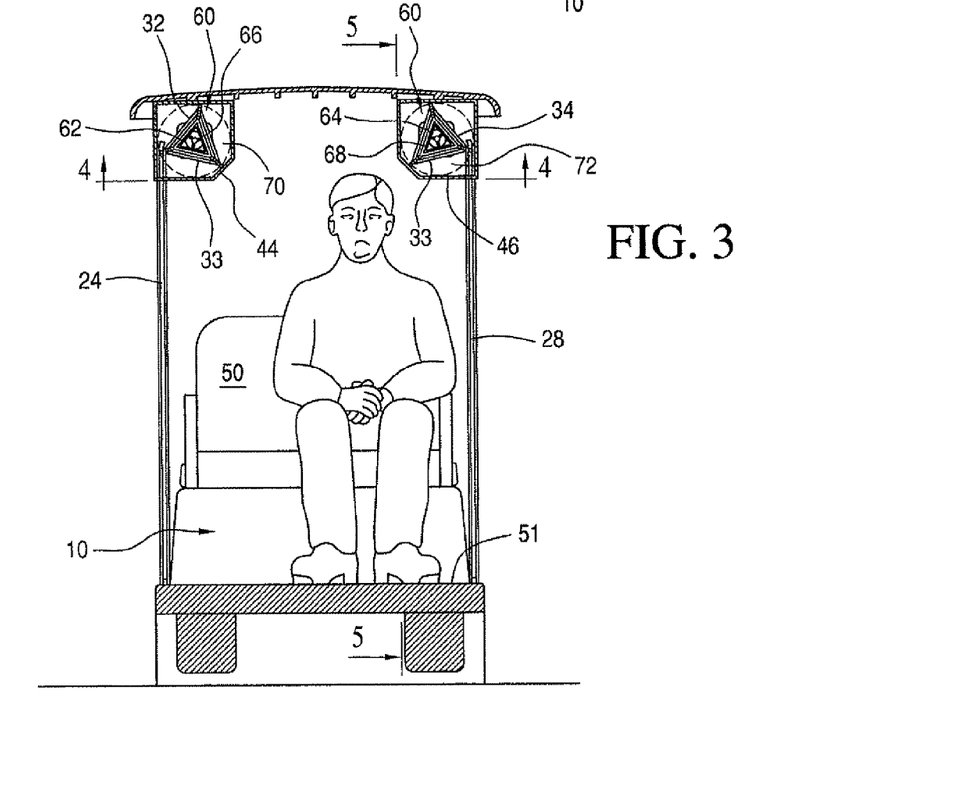
FIG. 3 is a front elevation of the golf cart shown in FIGS. 1 and 2.
Figure 4:
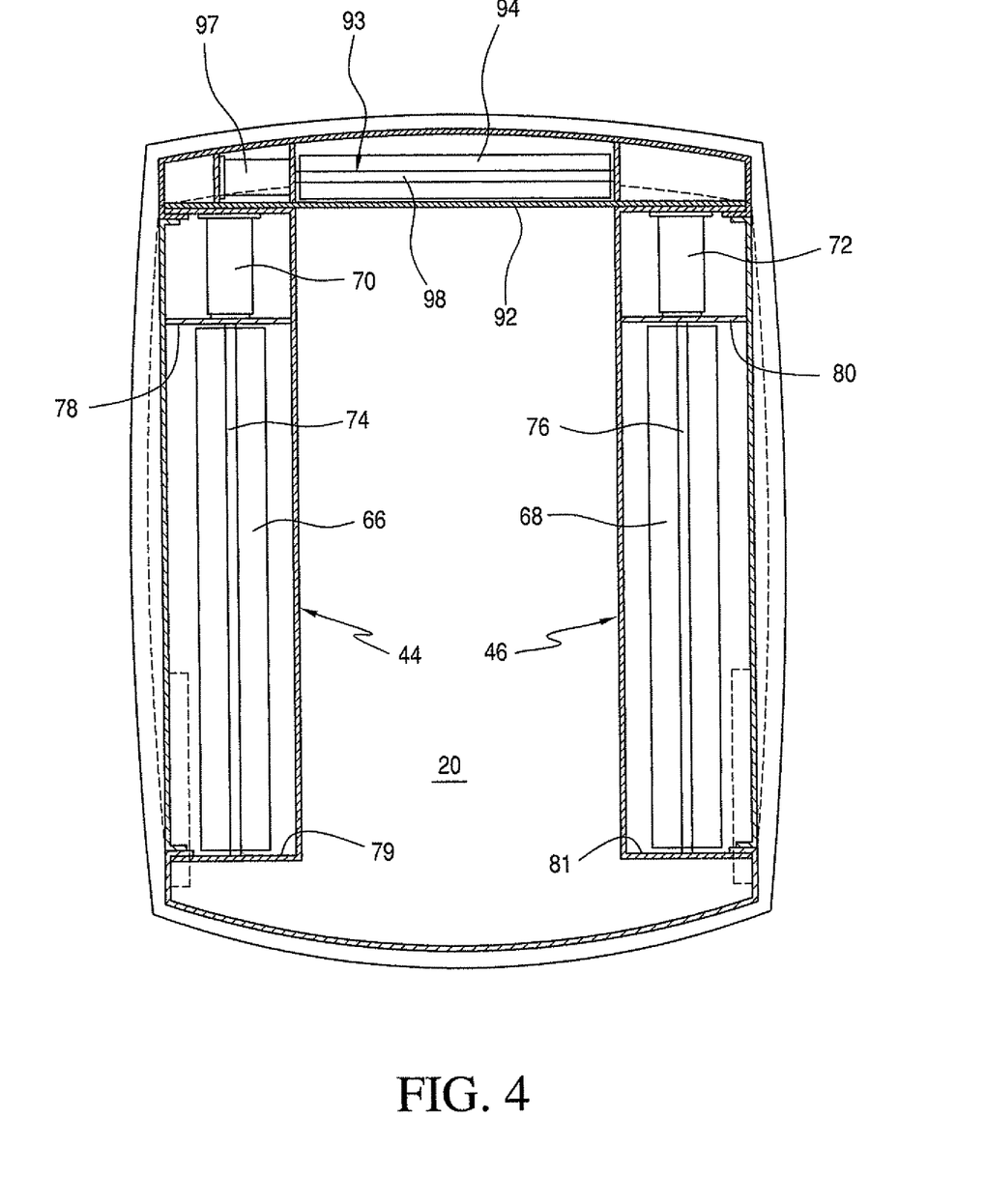
FIG. 4 is a view taken along the lines 4-4 of FIG. 3.

Referring now to FIGS. 3 and 4, there is shown the arrangement 60 for storing the side roll-up doors 32 and 34 and rear roll-up door 31 when the roll-up doors are not enclosing the golf cart 10. FIG. 3 shows the roll-up doors 32 and 34 stored adjacent the roof 20 on a pair of spools 62 and 64 which have spindles 66 and 68 that are polygonal, and preferably triangular, in cross section. The spindles 66 and 68 therefore present flat surfaces upon which the panels 33 of the roll-up doors 32 and 34 rest in stacked configurations when the roll-up doors 32 and 34 are coiled about the spindles 66 and 68.

As is seen in FIG. 4, associated with the spindles 66 and 68, are electric motors 70 and 72 that drive support shafts 74 and 76. The support shafts 74 and 76 are rotatably mounted on end walls 78, 79 and 80, 81 of housings 44 and 46, respectively. Optionally positioned on the roof 20 is a housing 92, which houses a spool 93 having a spindle 94, the spindle 94 being polygonal (preferably triangular) with flat surfaces upon which the roll-up rear door or window 31 is stored in the same manner as the roll-up side doors 32 and 34. A reversible DC motor 97 rotates the spindle 94 with a shaft 98 to deploy and store the rear roll-up window or door 31.

Figure 5:
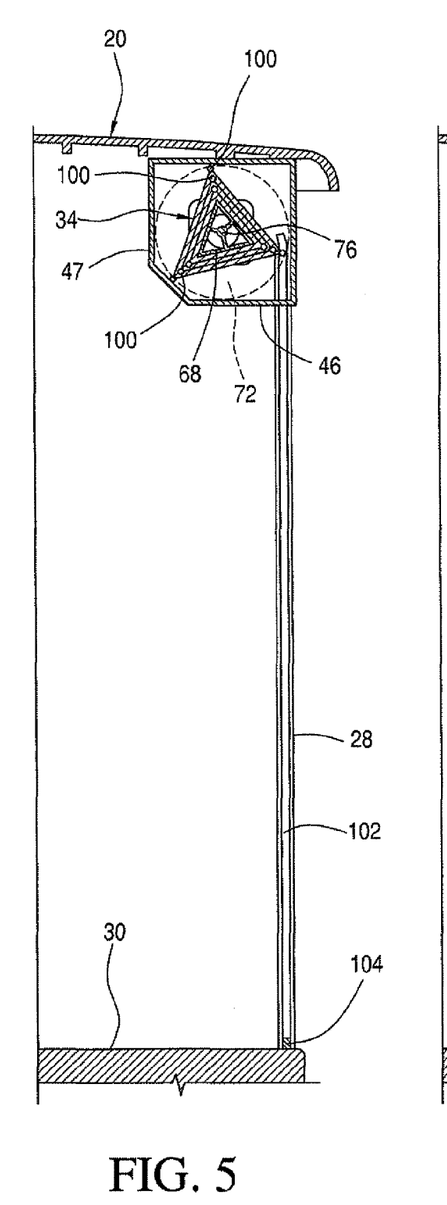
FIG. 5 is a current elevation of a portion of the golf cart and weather enclosure of FIGS. 1-4 taken along lines 5-5 of FIG. 3, showing an access housing closed and a roll-up door stored therein.
Figure 6:
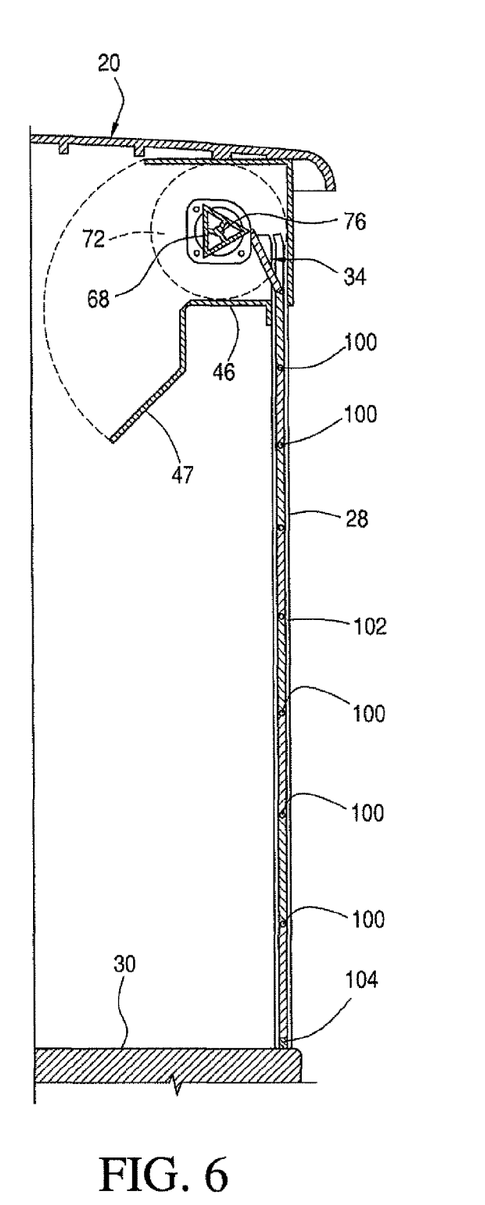
FIG. 6 is a view similar to FIG. 5 but showing the roll-up door deployed in the access housing open.

In FIG. 5 the roll-up panel 34 is shown rolled-up on the spindle 68 and in FIG. 6 the panel 34 is shown un-rolled from the spindle 68. Aligned with each of the hinges 35 (see FIGS. 1 and 7) joining the panels 33 are pintles 100 that are sequentially received in tracks 102 of the strut 26 extending between the floor 30 and the roof 20 of the golf cart 10. Each of the other struts 24, 28 and 29 are similarly provided with tracks, such as the track 102, for receiving pintles 100 extending from the hinges 35 along the longitudinal edges of the panels 33. As the motor 72 rotates the shaft 76 on which the spindle 68 is mounted, the pintles 100 travel progressively down the track 102 until the leading pintle 100 engages the floor 30 of the golf cart 10, at which time the motor 72 ceases to rotate. This is because there is a sensor 104 located at the floor 51 of the cart chassis 10, which sensor operates a cut-off switch that interrupts current to the motor 72. The motor 70 operates the roll-up door 32 in the same way and the aforedescribed motor 72 operates the roll-up door 34.

Connected to the motors 72 and 70 are sensors which recognize an increase in torque necessary to rotate the motors. These sensors are also connected to the power line of the motor to interrupt current to the motor if the roll-up door 34 engages an obstruction at any vertical location along the tracks 102 associated with the vertical struts 22, 24 and 26, 28. The roll-up door 32 has an arrangement similar to the roll-up door 34 for raising, lowering and stopping deployment of the roll-up door 30.

The housings 46, 44 (and the rear housing 92) each have a door 45 that is pivoted on a hinge 47 that provides access to the spools 66 and 68 and motors 72 for maintenance purposes as well as for allowing manual deployment and rewinding of the roll-up doors should that be necessary due to failure of the motors 70, 72 and 97.

Figure 7:
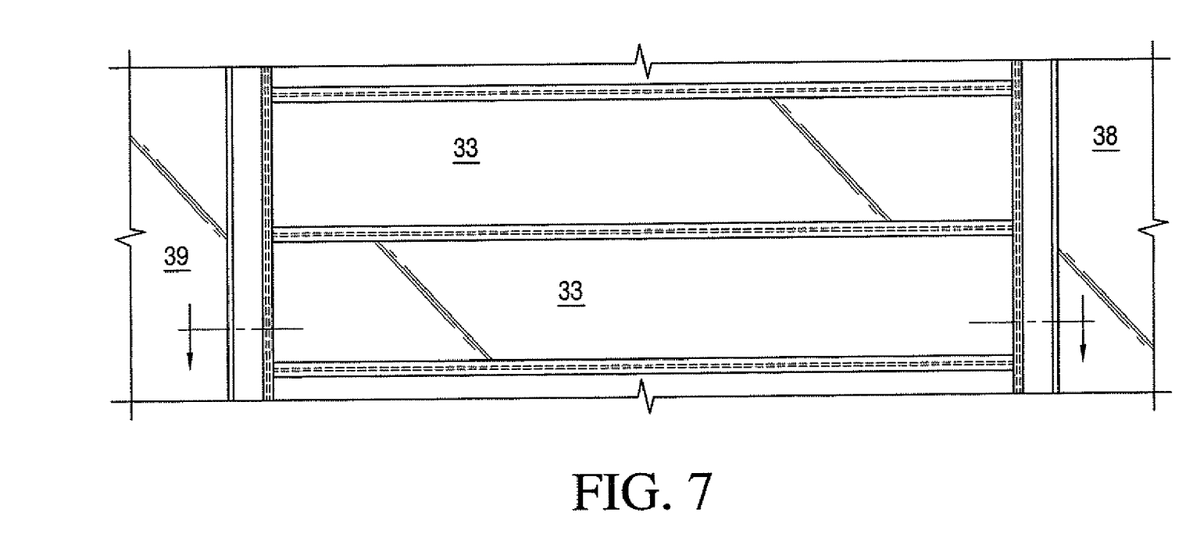
FIG. 7 is a planar view of a portion of the roll-up doors of FIG. 1.
Figure 8:
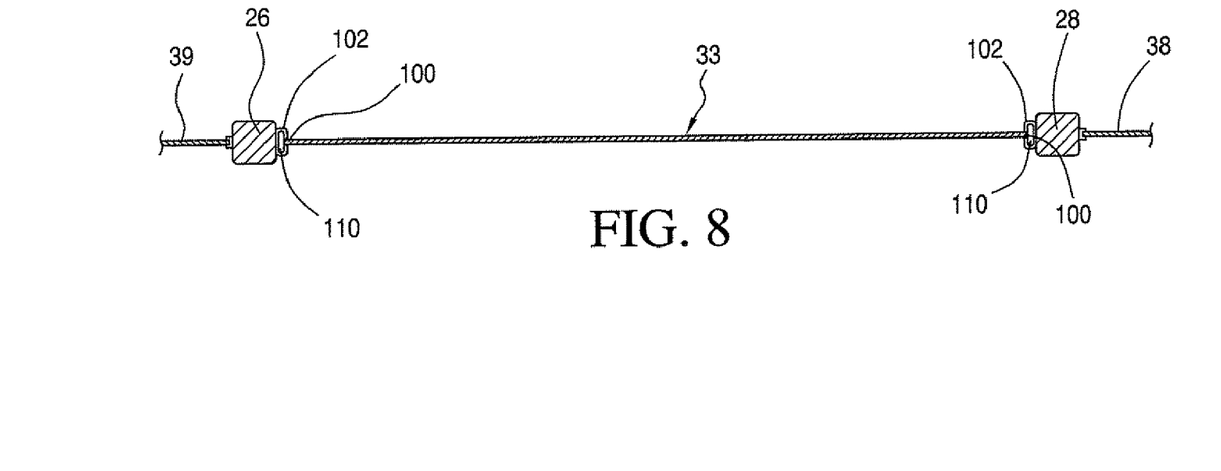
FIG. 8 is a view taken along lines 8-8 of FIG. 7.

Referring now to FIGS. 7 and 8, the panels 33 are jointed by clear plastic, preferably flexible silicon hinges 35, bonded to the panels 33. If the panels 33 are made of Plexiglas® they are rigid. Thus for flush storage the panels 33 require the polygonal, preferably triangular, spindles 66 and 68 of FIGS. 3, 5 and 6, in which case the hinges 35 preferably have increasing widths from the top to the bottom in order to facilitate stacking. As is seen in FIG. 8, the tracts 102 in the struts 26 and 28 retain rollers 110 mounted or the pintels 100.

Figure 9:
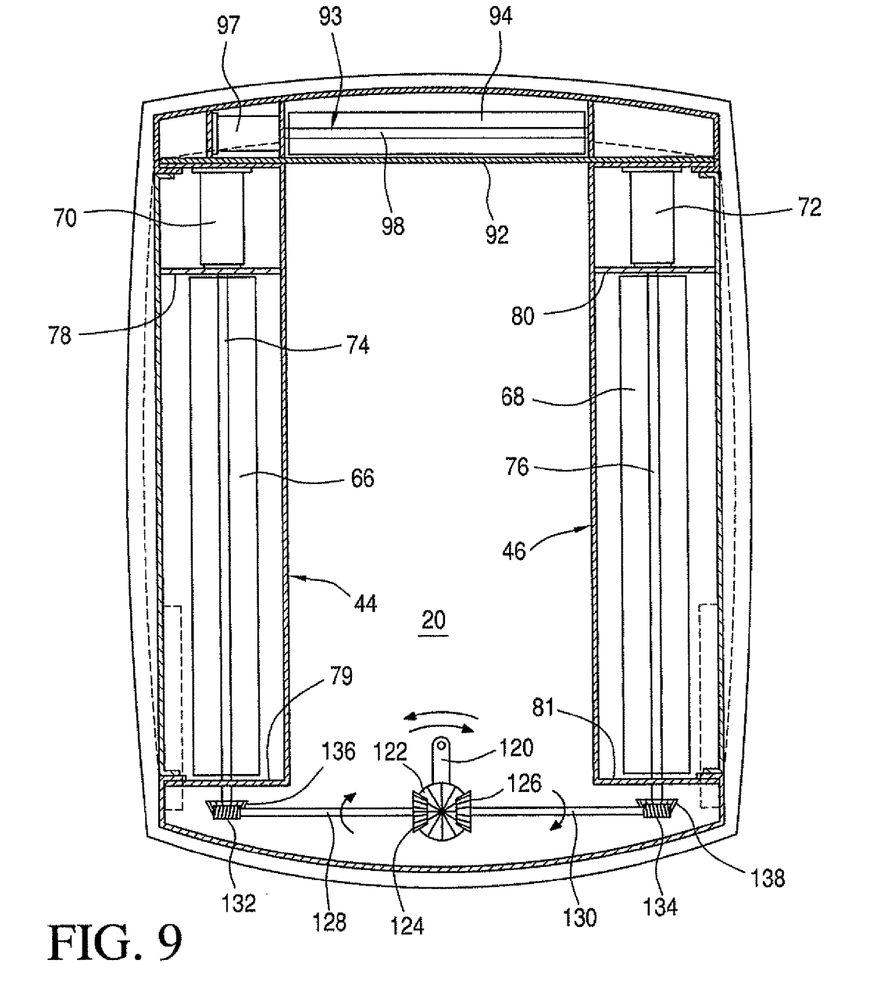
FIG. 9 is a view similar to FIG. 4, but showing a manual operator.

Referring now to FIG. 9, in order to provide for manual rotation of the shafts 74 and 76 that operate the side roll-up doors 30 and 32, a manual operator 118 in the form of a crank arm 120 is connected to a bevel gear 122 that meshes with a pair of bevel gears 124 and 126 which rotate shafts 128 and 130. The shafts 128 and 130 have worm gears 132 and 134 at opposite ends thereof which are in turn meshed with bevel gears 136 and 138 on the shafts 74 and 76 so as to turn the shafts 74 and 76 in opposite directions to coil and uncoil the roll-up doors 32 and 34. If electric motors 70 and 72 are present, clutches for coupling and uncoupling the motors from the shafts are optionally employed.

Figure 10:
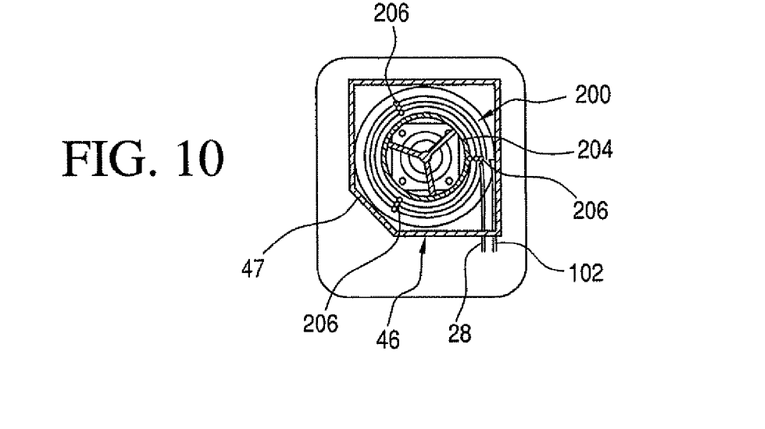
FIG. 10 is an end view of a second embodiment of the invention wherein a side door or back door is configured as a flexible vinyl panel coiled on a spool, rather than the segmented roll-up doors of FIGS. 1, 5, 6 and 7.

Referring now to FIG. 10, a second embodiment of the invention utilizes roll-up doors 200 made of transparent vinyl sheets. The roll-up doors 200 are stored by being coiled on cylinders 204 instead of triangular spindles such as the spindles 66 and 68. Like the roll-up doors 32 and 34, the roll-up doors 200 have pintles 206 which are received in tracks, such as the tracks 102 of FIGS. 5 and 6.

While the roll-up doors are shown in combination with a golf cart, in an embodiment of the invention the roll-up doors and associated with spools motors and tracks are configured as a kit for use with existing, commercially available golf carts.

The roll-up doors withstand greater wind speeds when configured of the panels 33 of FIG. 1, for example, winds of up to 45 mph. If the roll-up doors are of sheets of vinyl or other plastic material, wind resistance is lessened to winds of about 35 mph. In each case, the panels are configured of materials that do not transmit harmful components of sunlight.

Another options for the roll-up doors 32 and 34 using Plexiglas® or polycarbonate panels is to arrange the panels so that they lock into one another in a lapstrake fashion wherein the plastic joint 35 between the panels is not used, the panels being joined to one another with preferably clear plastic hinges at the side edges thereof instead of along the top and bottom edges.

The roll-up doors 32 and 34 made of panels 33 (FIG. 1) or made of a sheet of clear plastic 200 (FIG. 9) in accordance with one embodiment are stored in a single console mounted at the middle of the roof 20 instead of in two housings 44 and 46 located at the sides of the roof. This provides more head clearance over the occupants, reduces costs and may help with weight distribution.

Third Embodiment

Figures 11, 11A, 11B, 12, 13, 14:
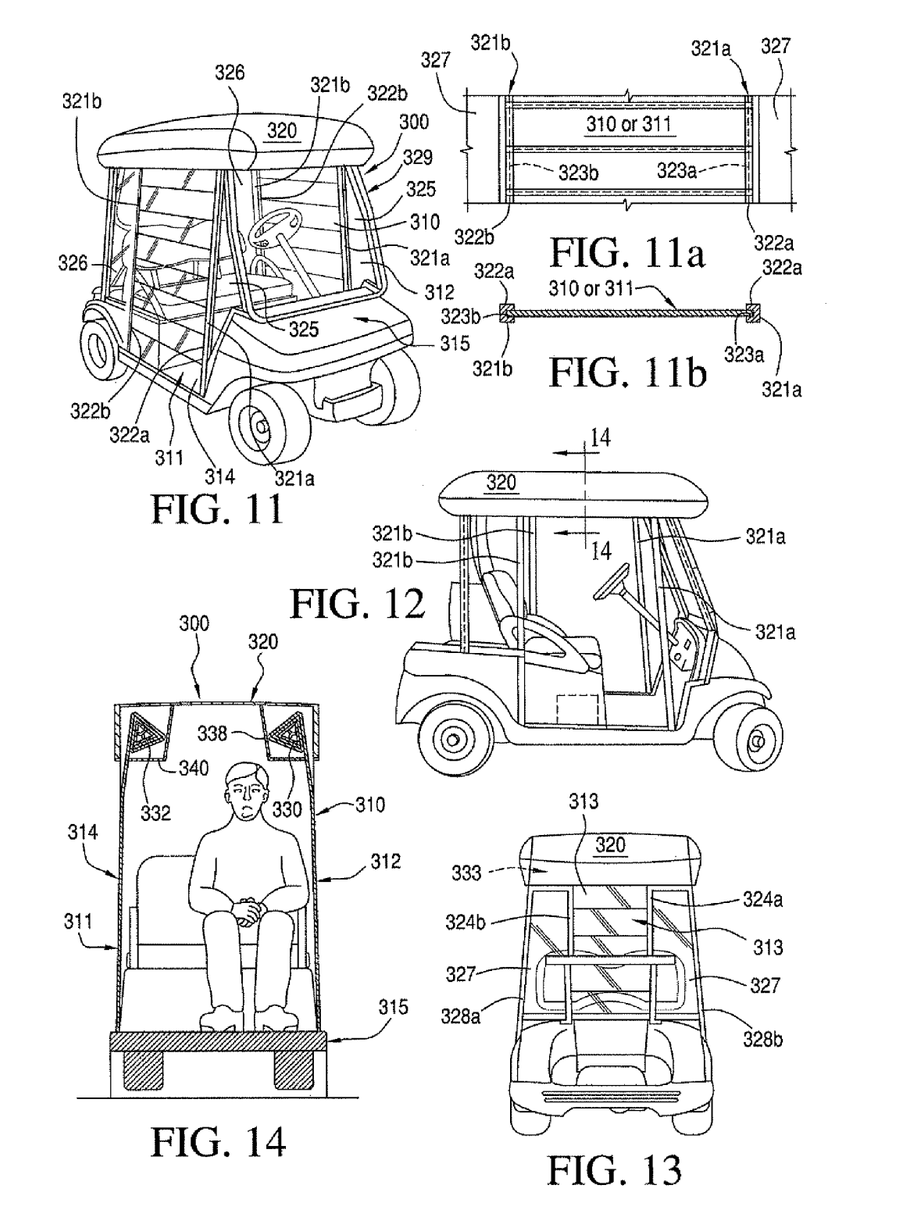

Referring now to FIGS. 11, 12 and 13 there is shown a golf cart enclosure 300 configured in accordance with a third embodiment of the present invention. As is shown in FIG. 11, roll-up doors 310 and 311 close the driver and passenger sides 312 and 314, respectively of a golf cart chassis 315. In the third embodiment shown in of FIGS. 11 and 12, the currently available or currently installed roof structure including supporting posts and frame members, as well as the roof itself, have been removed and replaced with the new enclosure 300 which includes a new roof 320 and new supporting post and frame members.

As is seen in FIGS. 11a and 11b, the new front and rear supporting posts 321a and 321b on the driver and passenger sides 312 and 314, respectively, each have tracks 322a and 322b defined by grooves which receive front and rear edge portions 323a and 323b of the roll-up doors 310 and 311 to stabilize the roll-up doors. Stabilizing the roll-up doors 310 and 311 is desirable when the doors are being raised and lowered. In addition the tracks 322a and 322b help minimize drafts by reducing substantially air currents between the roll-up doors 310 and 311 and supporting posts 321a and 321b on both the driver side 312 and passenger side 314 of the cart.

In FIG. 12 the roll-up doors 310 and 311 are retracted into the roof 320 and are not visible.

In FIG. 13, if desired by customers, a single, rear roll-up window or rear roll-up door 313 is installed to completely enclose the passenger compartment of the golf cart. The roll-up door 313 is retained in tracks in spaced apart rear posts 324a and 324b in the same manner as the roll-up doors 310 and 311 are retained in tracks 321a and 321b as shown in FIGS. 11a and 11b.

In order to accommodate the roll-up doors 310 and 311 and provide a complete enclosure, it is necessary to provide additional transparent, preferably Plexiglas panels. Accordingly, a pair or substantially triangular, transparent side panels 325 are provided at front driver and passenger sides 312 and 314 and pair of rear rectangular transparent, side panels 326 are provided at the rear driver and passenger sides. As is seen in FIG. 13 a pair of rear panels 327 are disposed between rear posts 324a and 324b and outside rear posts 328a and 328b. A windshield support 329 retains a conventional windshield in place on the cart. Each of the afore described posts and supports are attached to both the roof 320 and the cart chassis 315 to provide support for both the roof and the roll-up doors 310, 311 and 313.

Referring now to FIG. 14 which is a cross section or elevation through the roof 300 and chassis 315 along lines 14-14 of FIG. 12, it is seen that a pair of spools 330 and 332 are installed in the roof 320 adjacent the sides 312 and 314 of the golf cart to store and deploy the roll-up windows 310 and 311. The spools 330 and 332 are retained within housings 338 and 340, respectively, attached to the roof 320 to shield passengers from the spools 330 and 332. As the spool 330 rotates in a counterclockwise direction, the roll-up window 310 coils on the spool 330 and as the spool 332 rotates in a clockwise direction, the roll-up window 311 coils on the spool 332. Opposite rotation uncoils the roll-up windows 310 and 311 to enclose the passenger compartment of the golf cart.

Figure 15:
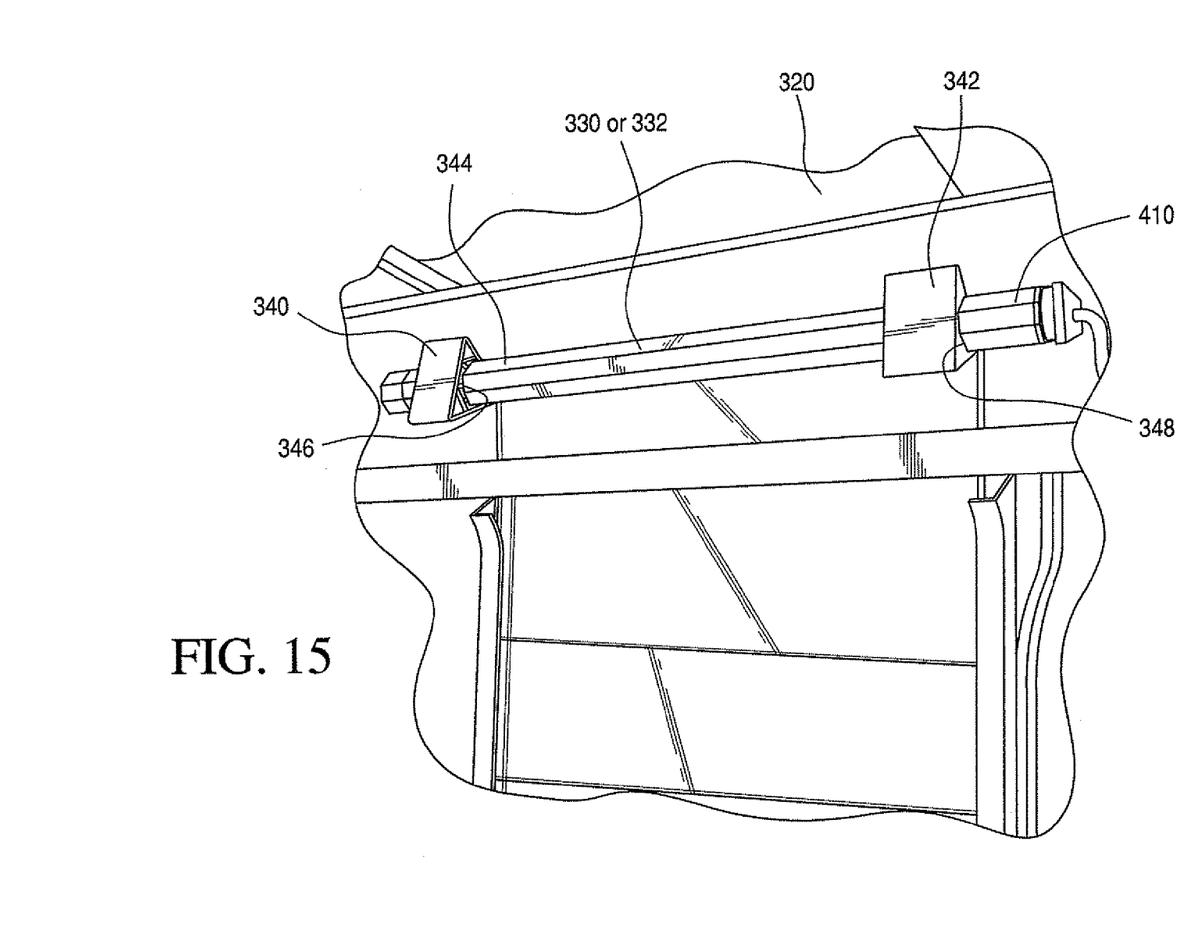

As is seen in FIG. 15 in conjunction with FIG. 14, each of the spools 330 and 332 include a pair of cams 340 and 342 welded to or otherwise fixed to a tubular shaft 344. The tubular shaft 344 is polygonal (for example, octagonal) in cross section and is received through octagonal openings 346 and 348 in the cams 340 and 342. Since the cams 340 and 342 are rotationally fixed to the tubular shaft 344, the cams rotate with the tubular shaft.

Figure 16:
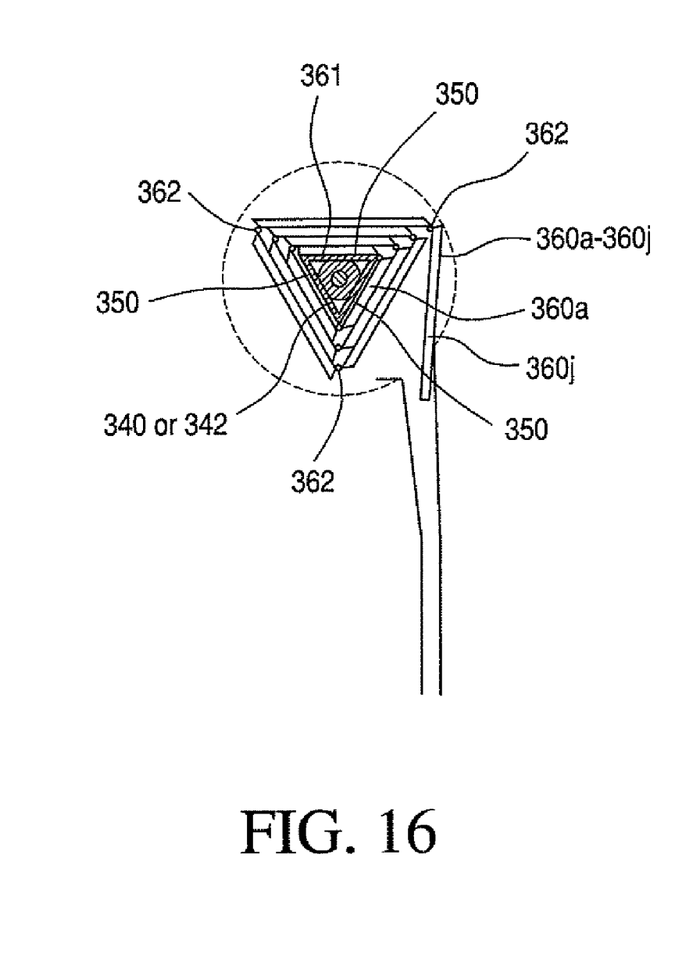
FIG. 16 is a cross section of a spool arrangement showing one of the roll-up side windows being supported on the spool arrangement.

As is seen in FIG. 16 in conjunction with FIG. 15, each of the cams 340 and 342 is triangular in cross section and each cam has three flat surfaces 350. Each of the roll-up doors 310 and 311 is comprised of separate panels 360a-360j connected it by hinges 362. The panels 360a-360j accumulate on the surfaces 350 as the roll-up doors 310 and 311 are coiled on the cams 340 and 342, while the roll-up doors 310 and 311 hang from one of the flat surfaces 350 by an attachment panel 361 when the roll-up doors are deployed to enclose the passenger compartment of the golf cart.

As is seen in FIG. 16, the plexiglas panels 360a-360j differ in width because the coil of panels around the cams 340 and 342 become thicker as the roll-up windows accumulate on the cams 340 and 342. Consequently, the individual panels 360a-360j increase substantially in width from the upper most panel 360a to the lowest panel 360j. For example, the bottom panel 360j may be almost twice the width of the upper most panel, or the bottom panel may be longer since the bottom panel can vary in width.

Figure 17:
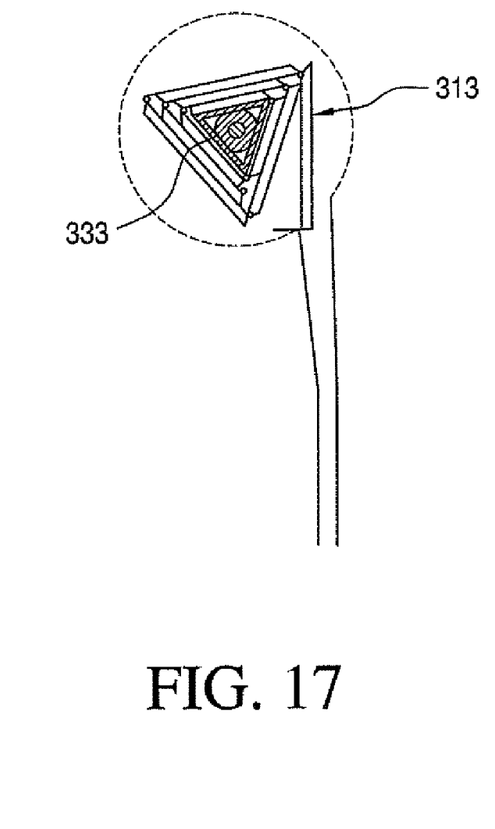
FIG. 17 is a cross section of a spool arrangement similar to FIG. 16, but used for supporting a rear roll-up window.

Referring now to FIG. 17, where the rear roll-up door 313 is shown mounted on a third spool 333, it is seen that there are fewer panels 360a-360h because the height rear roll-up door 313 is less than the side roll-up door 310 and 312. The rear roll-up door 313 has separate panels 360a-360h which are not as long (measured horizontally) and the separate panels 360a-360h of the side roll-up doors 310 and 311.

Figure 18:
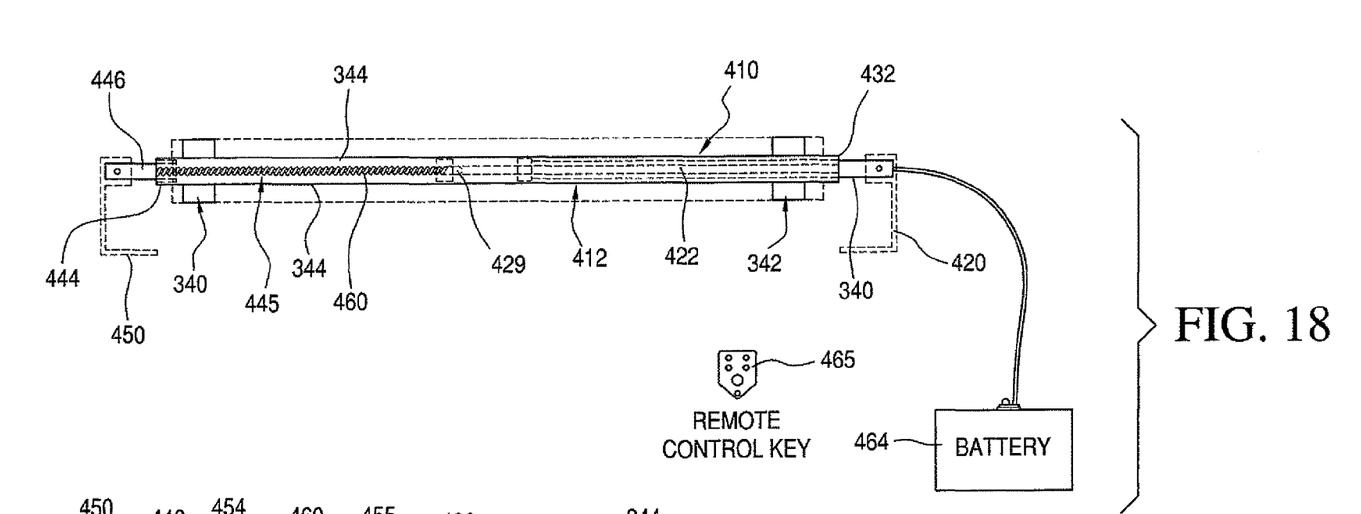
FIG. 18 is schematic arrangement of a motor spring drive for lowering and raising the roll-up windows.
Figures 19, 20:
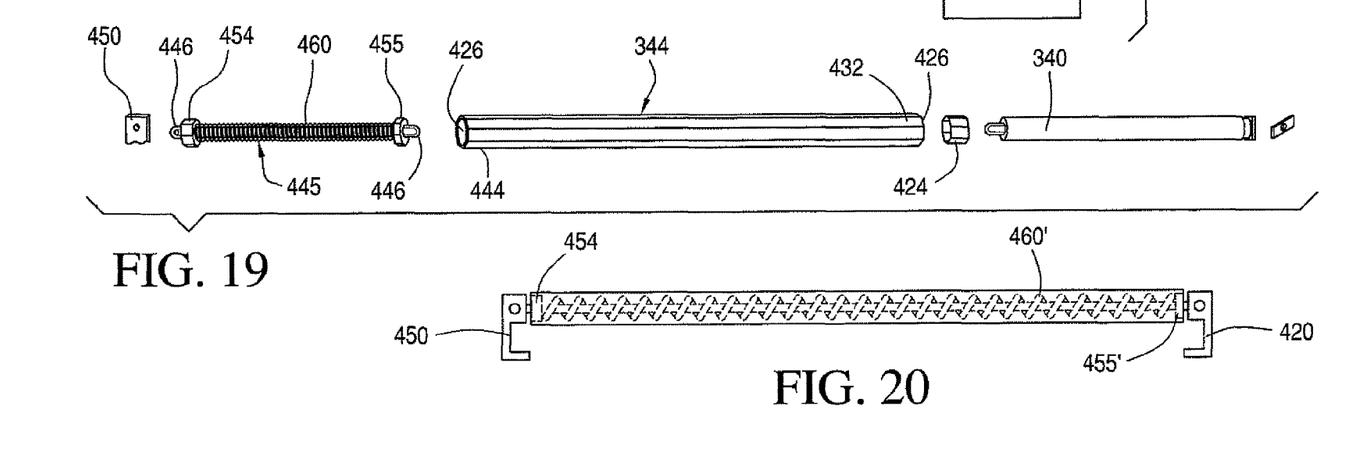
FIG. 19 is an exploded view showing elements of the drive of FIG. 18 prior to assembly.
FIG. 20 is a view similar to claim 18 using only a spring to assist in operation of the roll-up door.

Referring now to FIGS. 18 and 19, a motorized drive system 400 using a low voltage tubular motor 410 and a spool support assembly 412 locates the spools 330 and 332 thereon. Each spool assembly 412 comprises the tubular shaft 344 that supports the spaced cams 340 and 342 of FIG. 15. The tubular motor 410 has a first end 413 which is fixed by a bracket 420 to the roof 320 (FIGS. 11-14) of the golf cart. The tubular motor 410 has a shaft 422 which is secured to an octagonal drive 424. The octagonal drive 424 and motor 410 are inserted into the octagonal interior 426 of the tube 344 with the octagonal motor drive 424 complementing the octagonal interior 426 of the octagonal tube 344 so that the octagonal motor drive 424 rotates the octagonal tube 344 with respect to the tubular motor 410 and the roof 320 of the golf cart in order to raise and lower the lower door 310 or 311 mounted on the cams 340 and 342. The tubular shaft 344 is therefore both supported and rotated by the motor 410, with a motor crown 430 disposed within a first end 432 of the tubular shaft 344, the motor crown being rotatable with respect to the motor 410.

Preferably, the tubular low voltage motor is powered by 12 volt current from a storage battery 464 and controlled by a wireless remote key control 465. A fixed control is also mounted within the cabin of the cart.

A second end 444 of the tubular shaft 344 is supported by a spring assembly 445 that has rectangular shaft 446 with a projecting end 448 that is non-rotably received in a bracket 450 which is fixed to the roof 320 (FIGS. 11-14) of the golf cart. The tubular shaft 344 is therefore supported at both ends 444 and 432 in the roof 320 as is shown in FIG. 15. The spring assembly 445 includes a pair of octagonal elements 454 and 455. The octagonal element 454 sits within the second end 444 of the tubular shaft 344 and allows the tubular shaft 344 to rotate with respect to the fixed bracket 450 and therefore rotate with respect to the roof 320. The octagonal element 455 also meshes with the octagonal interior surface 426 of the tubular shaft 344, but is attached to a coil spring 460 which is coaxial with the shaft 446. The other end of the spring 460 is fixed to the shaft 446 which is of course held stationary by the bracket 450. Consequently, as the tubular shaft 344 rotates in one direction, for example in the clockwise direction to uncoil the roll-up door 310 from the spool 330 in FIG. 14 and to tension the spring 460, and when the spool 332 is rotated into counterclockwise direction to uncoil the roll-up door 311 from the spool 332, the spring 460 in the associated drive 400 coils and tensions the spring 460. Accordingly, when the roll-up doors 310 and 311 are rolled down by the motor 410 the spring counteracts the weight of the roll-up door panels 360a-j, which weight increases as additional panels are deployed. Thus, tension in the spring due to winding of the spring helps offset the weight of the panels as they are unwind from the spools 330 and 332. Conversely, the energy stored in the springs 460 is available to help lift the panels 360a-360-j when it is desired to open the roll-up doors 310 and 311.

Preferably, the springs 460 associated with each roll-up door 310 and 311 are pre-tensioned prior to installation of the enclosure assembly on the golf cart to help offset the weight of the roll-up doors. The rear roll-up door or window 313 preferably does not have a spring and relies on only a motor. This is because the rear roll-up door 313 is lighter and less accessible from the cabin.

The motor 410 has a conventional internal brake which engages upon rotation of the motor ceasing. The brake holds the roll-up doors 310 and 311 closed when the motor is stopped. If there is a need to exit the vehicle, a switch releases the internal brake allowing the roll-up doors to retract with the help of the uncoiling springs 460 in each of the motor spring assemblies 400.

Referring now to FIG. 20, where another embodiment of the invention is shown, the motor 410 is deleted and a coil spring of $460^1$ is provided. When the arrangement of FIG. 20, the roll-up doors 310 and 311 each have a handle on the lowest panel 360j which is manually pulled down to wind and thus tension the spring. The spring's energy is therefore available to raise the roll-up door. Preferably, the springs $460^1$ can be mechanically programmed to hold the roll-up doors 310 and 311 closed when the springs are wound up and tensioned. Upon lifting the roll-up doors slightly the springs $460^1$ unwind and pull the roll-up doors 310 and 311 to the retracted position. Alternatively, an arrangement is provided wherein in order to prevent rapid rising of the door, a one-way rotational damper is installed to slow rapid retraction of the roll-up doors. The rotational damper may be installed at the location of the motor 410 in FIGS. 18 and 19. In this arrangement, the same previously discussed brake may be provided to hold the roll-up door closed.

An air conditioning arrangement is optionally provided comprising an ice container or containers within an enclosure wherein air is drawn into the enclosure and passed over and/or through the ice before exiting into the enclosure. The air is drawn into the container by a fan powered from the cart's 12 volt battery bank. Preferably the enclosure is mounted on the rear of the cart and is connected to the enclosure by a duct.

From the foregoing description, one skilled in the art can easily ascertain the essential characteristics of this invention, and without departing form the spirit and scope thereof, can make various changes and modifications of the invention to adapt it to various usages and conditions.

The invention claimed is:

1. An enclosure for mounting on the chassis of a golf cart, the enclosure comprising:
   a roof having a pair of sides, a front and a rear;

at least two pairs of vertical side struts with spaces therebetween defining openings for the side doors, the side struts being attached to the roof for supporting the roof;

opposed tracks having facing vertical channels associated with each pair of vertical side struts;

side roll-up doors attached to the roof and having edges received in the opposed tracks, the doors being comprised of transparent, substantially rigid panels connected by hinges;

a pair of single spools disposed within the roof with each side roll-up door being attached at a top portion to one of the single spools, wherein as the single spools rotate in a first direction the side roll-up doors roll-up on the spools and as the spools rotate in an opposite direction the side roll-up doors slide down the tracks and close the opening, the spools being electrically or manually rotatable, and each of the spools having a polygonal surface for accumulating panels in a coil thereon with the panels and hinges having widths selected so that panels initially lie flat against the polygonal surface and subsequently lie flat against adjacent previously accumulated panels to provide a compact accumulation of panels on each spool.

2. The enclosure of claim 1, wherein the spools each have first and second ends with the second ends being joined by a spring to the first end and with the second ends being fixed with respect to the roof while the first ends are rotatable with respect to the roof; wherein tension is stored in the springs as the spools are rotated in a first direction upon closing the door with the panels being suspended from the spool, and wherein the springs uncoil to rotate the spools in a second direction to open the door by accumulating the panels on the spools.

3. The enclosure of claim 2, wherein the spools each have a motor coupled with the first end of the spools for lowering the roll-up doors against the bias of the spring and for raising the doors using the bias of the springs to compensate for the weight of the doors.

4. The enclosure of claim 3, wherein the spools are rotated against the bias of a coil spring to lower the roll-up doors and wherein the energy accumulated in the coil spring is available to lift the roll-up doors.

5. The enclosure of claim 1 wherein each polygonal surface is triangular in cross section.

6. The enclosure of claim 5 wherein the widths of panels for subsequent overlapping layers of panels on the spools are increased so that the panels lie flat upon one another.

7. The enclosure of claim 1 wherein the widths of panels for subsequent overlapping layers of panels on the spools are increased so that the panels lie flat upon one another.

* * * * *